United States Patent
Thakur

(10) Patent No.: US 10,207,682 B2
(45) Date of Patent: Feb. 19, 2019

(54) RUBBER WIPER BLADE ELEMENT WITH FRICTION REDUCING AGENT THAT CONTINUOUSLY MIGRATES TO THE SURFACE

(71) Applicant: FEDERAL-MOGUL MOTORPARTS CORPORATION, Southfield, MI (US)

(72) Inventor: Amod A. Thakur, Ann Arbor, MI (US)

(73) Assignee: Federal-Mogul Motorparts LLC, Southfield, MI (US)

( * ) Notice: Subject to any disclaimer, the term of this patent is extended or adjusted under 35 U.S.C. 154(b) by 273 days.

(21) Appl. No.: 14/736,409

(22) Filed: Jun. 11, 2015

(65) Prior Publication Data

US 2016/0362087 A1    Dec. 15, 2016

(51) Int. Cl.
  *B60S 1/38*    (2006.01)

(52) U.S. Cl.
  CPC .............. *B60S 1/38* (2013.01); *B60S 1/3808* (2013.01); *B60S 2001/3829* (2013.01); *B60S 2001/3898* (2013.01)

(58) Field of Classification Search
  CPC ........................................................ B60S 1/38
  USPC ........................................................ 523/149
  See application file for complete search history.

(56) References Cited

U.S. PATENT DOCUMENTS

| | | | |
|---|---|---|---|
| 3,972,850 A | 8/1976 | Hamilton et al. | |
| 5,283,927 A | 2/1994 | Gibbon et al. | |
| 5,325,564 A * | 7/1994 | Swanepoel | B60S 1/38 15/250.44 |
| 5,610,213 A | 3/1997 | Sumpter et al. | |
| 5,623,028 A | 4/1997 | Fitzgerald et al. | |
| 5,948,846 A * | 9/1999 | Libert | C08K 3/34 524/232 |
| 5,977,220 A | 11/1999 | Burkus et al. | |
| 5,998,515 A | 12/1999 | Burkus et al. | |
| 5,998,516 A | 12/1999 | Burkus et al. | |
| 7,028,367 B2 | 4/2006 | Sharabura et al. | |
| 7,373,687 B2 | 5/2008 | Sharabura et al. | |
| 7,703,167 B2 | 4/2010 | Sharabura et al. | |
| 7,901,657 B2 | 3/2011 | Arpac et al. | |
| 8,148,467 B2 | 4/2012 | Pieters et al. | |
| 8,443,483 B2 | 5/2013 | Dallos et al. | |
| 8,679,638 B2 | 3/2014 | Mizote et al. | |
| 2003/0229961 A1 * | 12/2003 | Barnett | B60S 1/38 15/250.48 |
| 2006/0089276 A1 * | 4/2006 | Klotz | C08J 7/047 508/464 |
| 2010/0146728 A1 | 6/2010 | Sharabura et al. | |
| 2011/0210521 A1 * | 9/2011 | Warren | F16J 15/104 277/650 |

* cited by examiner

*Primary Examiner* — Doris L Lee
(74) *Attorney, Agent, or Firm* — Robert L. Stearns; Dickinson Wright, PLLC

(57) ABSTRACT

A windscreen wiper device is provided including a longitudinally extending wiper strip of a flexible material. At least one carrier of a spring-like material operatively supports and biases the wiper strip into a predetermined configuration. The windscreen wiper device further includes a connecting device for connection with a wiper arm. The flexible material is formed of flexible material, such as rubber, with a friction reducing agent consisting of at least one amide distributed homogeneously throughout the flexible material. Upon vulcanization, a portion of the friction reducing agent migrates to an outer surface of the flexible material to form a friction reducing film having hydrophobic properties. The friction reducing film provides a low friction interface between the flexible material and a windshield under wet and dry conditions. The low friction minimizes the load on the wiper device and thus extends the life of the wiper device.

9 Claims, 4 Drawing Sheets

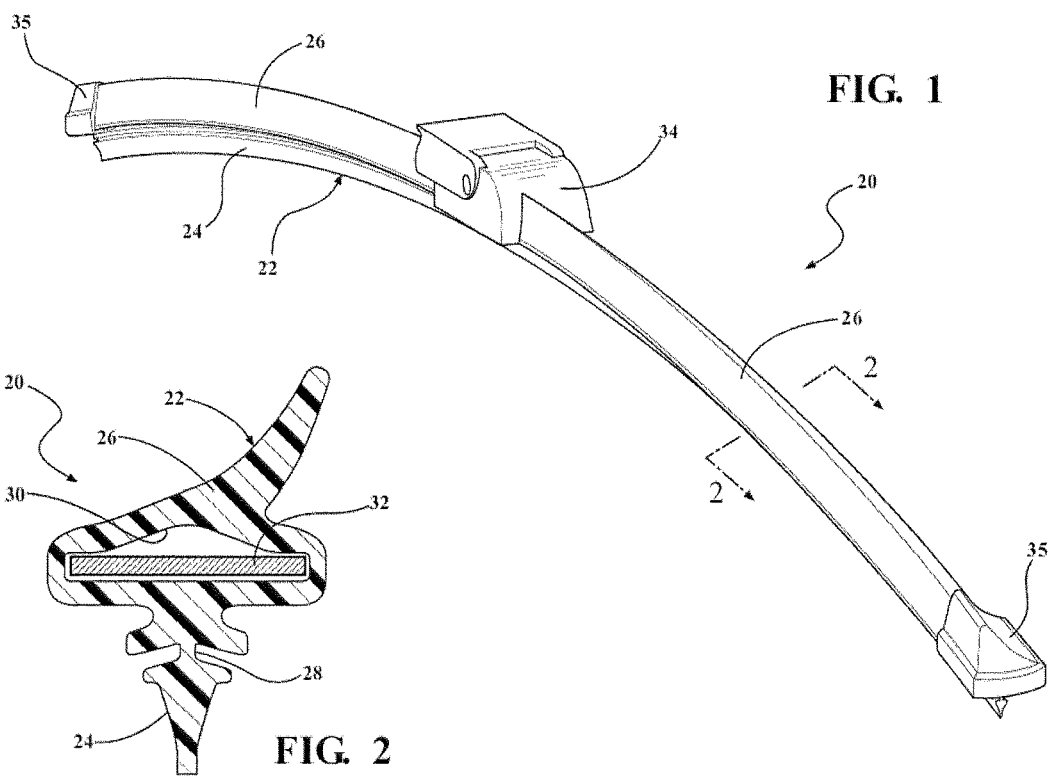

RUBBER WIPER BLADE ELEMENT WITH FRICTION REDUCING AGENT THAT CONTINUOUSLY MIGRATES TO THE SURFACE

BACKGROUND OF THE INVENTION

1. Field of the Invention

The present invention is generally related to windscreen wiper devices, and more precisely to wiper strips of windscreen wiper devices.

2. Related Art

The wiper strips of typical windscreen wiper devices, or wiper blades, are formed of a rubber material which seals against a vehicle's windshield to drive water, snow or other elements away therefrom. Materials having, among other things, a good resistance to abrasion, a low frictional surface and good slip properties are generally chosen to give the wiper blades a good wipe quality. Oftentimes, a material which improves one or more of these qualities has a negative effect on others. For example, soft rubbers may produce wiper strips which exhibit exceptional wipe quality but also have an undesirably high frictional resistance, which could reduce the lifespans of such wiper blades.

Some wiper manufacturers have attempted to improve the performance of their wiper blades by applying a coating having hydrophobic properties to the wiper strips. Such coatings allow the wiper strip to be formed of a harder rubber, resulting in reduced friction and longer life, without compromising wipe quality. However, such coatings may be very costly and/or difficult to apply to the wiper strip. The coatings may also wear out over time due to extended use or abuse. When the coating wears away, the untreated or uncoated rubber is exposed, thereby increasing the friction between the wiper strip and the windshield, which results in a reduced wipe quality.

SUMMARY OF THE INVENTION

One aspect of the present invention provides for a windscreen wiper device for a vehicle with improved performance and lifespan. The windscreen wiper device includes a longitudinally extending wiper strip of a flexible material. At least a portion of the flexible material of the wiper strip comprises a friction reducing agent including at least one amide.

Upon vulcanization, a portion of the friction reducing agent migrates to the outer surface of the wiper strip and forms a friction reducing film along an exposed outer surface of the flexible material. In addition, as the friction reducing film wears down during use of the wiper device, portions of the friction reducing agent continuously migrate to the outer surface of the wiper strip to replenish or renew the friction reducing film.

The friction reducing film provides a low friction interface between the flexible material of the wiper strip and a windshield of the vehicle under both wet and dry conditions. The low friction minimizes the load on the wiper device and thus extends the life of the wiper device. The friction reducing film also has hydrophobic properties, and thus can prevent or reduce the size of water beads, and also prevent the build-up of water, ice, and snow. The friction reducing film may also reduce noise, such as squeak and reversal chirp, typically associated with high friction between the wiper strip and the windshield.

Another aspect of the present invention is a method of making a windscreen wiper device. The method includes the step of forming a longitudinally extending wiper strip of a flexible material which includes a friction reducing agent, wherein the friction reducing agent includes at least one amide.

Yet another aspect of the present invention is a method of making a windscreen wiper device including a wiper strip with a friction reducing film. The method includes the step of forming a longitudinally extending wiper strip of a flexible material including a mixture of rubber and a friction reducing agent, wherein the friction reducing agent includes at least one amide. The method further includes vulcanizing the flexible material of the wiper strip. The vulcanizing step includes forming the friction reducing film on an outer surface of the flexible material, and the friction reducing film includes the at least one friction reducing agent.

Another aspect of the invention provides a windscreen wiper element, comprising a wiper element body fabricated of a molded or extruded rubber, polymer, or plastic base material and including a longitudinally extending wiper lip. The base material has incorporated therein an additional friction reducing agent that is operative during use of the wiper element to migrate to an outer surface of the wiper element and to provide a hydrophobic effect to the outer surface that is greater than that provided by the base material itself

BRIEF DESCRIPTION OF THE DRAWINGS

These and other features and advantages of the present invention will be readily appreciated, as the same becomes better understood by reference to the following detailed description when considered in connection with the accompanying drawings wherein:

FIG. 1 is a perspective and elevation view of an exemplary windscreen wiper device;

FIG. 2 is a cross-sectional view of the exemplary windscreen wiper device taken through line 2-2 of FIG. 1;

DESCRIPTION OF THE ENABLING EMBODIMENT

Figure 3A:
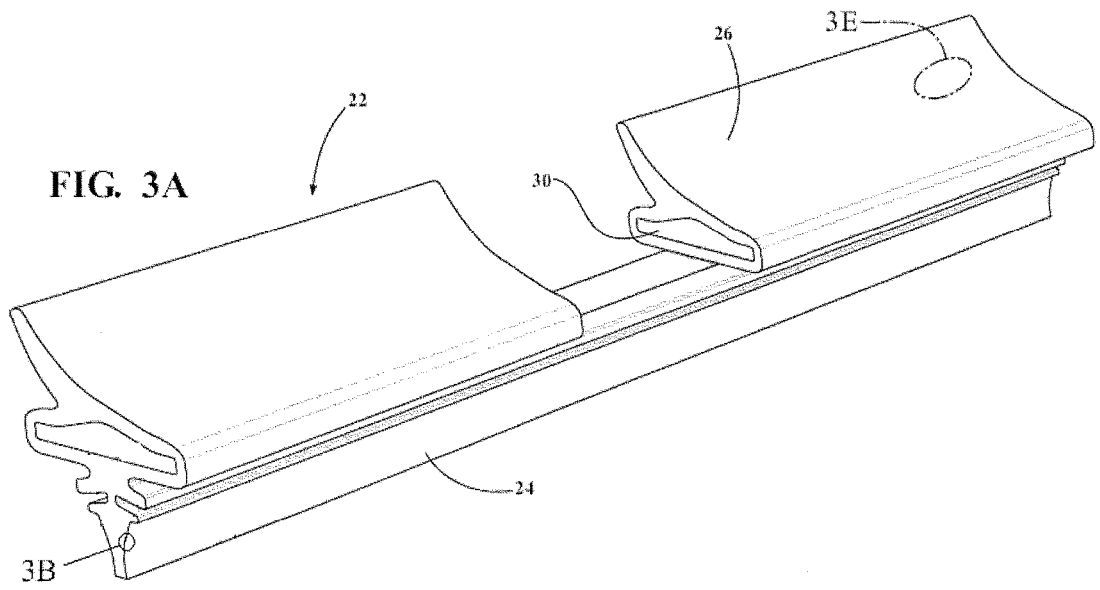
FIG. 3A is a perspective and elevation view of a wiper strip formed of a flexible material of the windscreen wiper device of FIG. 1.

Referring to the Figures, wherein like numerals indicate corresponding parts throughout the several views, an exemplary windscreen wiper device 20 (or a wiper blade) constructed according to one aspect of the invention is generally shown in FIG. 1. Referring now to the cross-sectional views of FIGS. 2 and 3A, the exemplary windscreen wiper device 20 includes a wiper strip 22, also referred to as a wiper element. The wiper strip 22 has a wiping portion 24, also referred to as a wiper lip, a spoiler portion 26 and a hinge portion 28 all integrally connected to one another and formed as one piece of material with the hinge portion 28 being disposed between the wiping and spoiler portions 24, 26. The wiper strip 22 presents an outer surface 27 for engaging a windshield of a vehicle. The spoiler portion 26 presents a longitudinally extending channel 30, and a carrier 32 (sometimes referred to as a "flexor") is disposed in the channel 30. The carrier 32 is of a spring-like material (such as spring steel) and operatively supports and biases the wiper strip 22 into a predetermined configuration. Referring back to FIG. 1, the exemplary windscreen wiper device 20 is a "beam" style device because it lacks the levers and frame found on traditional windscreen wiper devices. As such, the exemplary carrier 32 (shown in FIG. 2) is self-biased into a curved shape to bias the wiper strip 22 into a curved configuration, thereby allowing it to conform to windshields of differing curvatures. The exemplary windscreen wiper device 20 also includes a connecting device 34 for connection with a wiper arm (not shown). Additionally, end caps 35 are secured to either the wiper strip 22 or to the carrier 32 at the ends of the exemplary windscreen wiper device 20.

Figure 4:
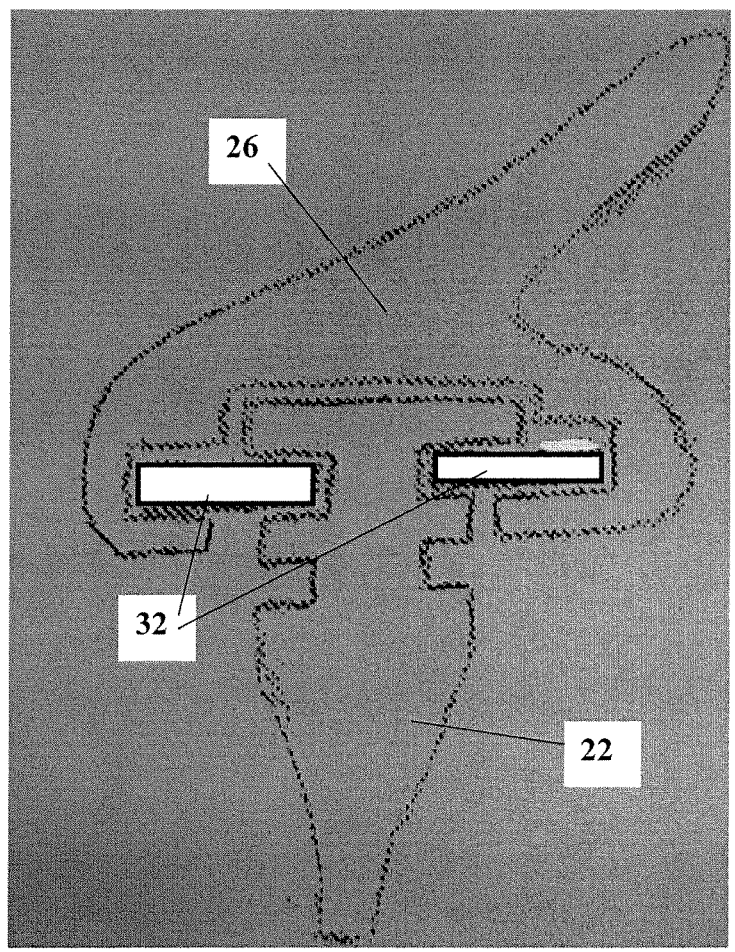
FIG. 4 is a cross-sectional view of a wiper strip, carrier, and spoiler of a windscreen wiper device according to another exemplary embodiment.
Figure 5:
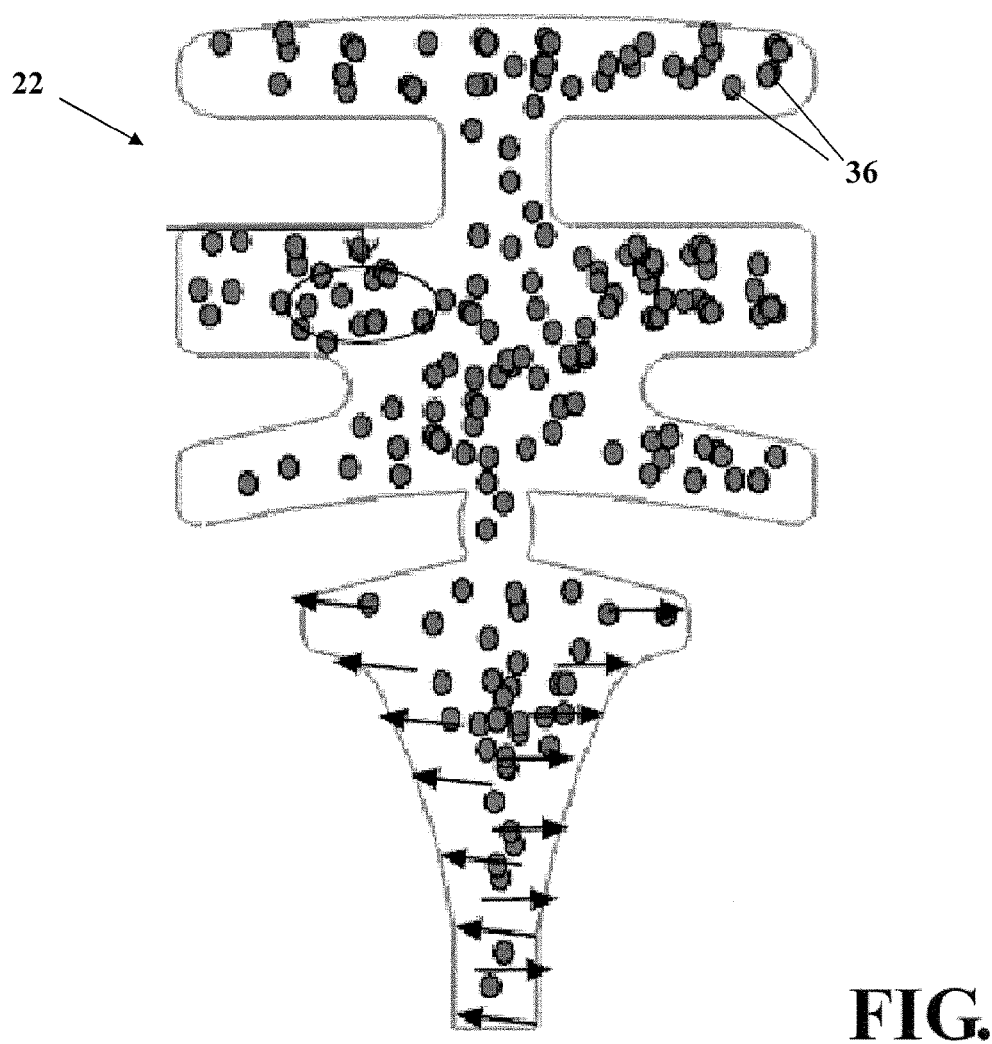
FIG. 5 is a cross-sectional view of a wiper strip including a friction reducing agent disposed throughout a flexible material according to yet another exemplary embodiment.

However, it should be appreciated that other windscreen wiper device designs can be employed. For example, the windscreen wiper device can comprise a traditional style having a frame with a plurality of levers and a generally linearly biased carrier. The windscreen wiper device 20 could also include a separate wiper strip 22, carrier 32, and spoiler 26, as shown in FIG. 4. In this embodiment, the wiper strip 22 presents two oppositely facing lateral grooves. Two longitudinally extending strips, which together form the carrier 32, are disposed in the lateral grooves. The spoiler 26 is a separate component surrounding the carrier 32 and a portion of the wiper strip 22. FIG. 5 is a cross-sectional view of yet another wiper strip 22 which could be employed in the wiper device 20.

The exemplary wiper strip 22 is formed of a flexible and elastic base material, such as rubber, plastic, and/or polymer, for sealing against a vehicle's windshield (not shown) and for driving rain, snow or other elements away therefrom. In the example embodiments, the rubber used to form the flexible material is natural rubber or polyisoprene. However, other types of rubber could be employed, such as synthetic rubber. In another embodiment, the flexible material used to form the wiper strip 22 includes a mixture of different rubbers, for example a blend of natural and synthetic rubber.

Figure 3B:
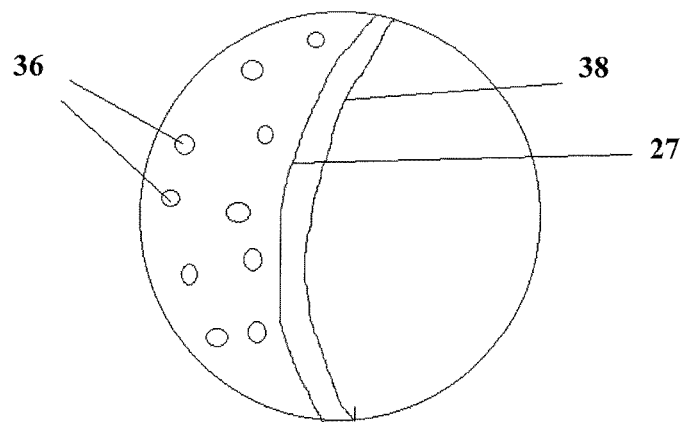
FIG. 3B is an enlarged view taken of a wiping portion of the wiper strip of FIG. 3A showing a friction reducing agent disposed throughout the flexible material and a friction reducing film along an outer surface of the wiper strip.

Referring now to FIGS. 3A and 3B, at least a portion of the flexible material of the wiper strip 22 comprises a friction reducing agent 36. In the exemplary embodiments, the friction reducing agent 36 is provided as a plurality of particles disposed homogenously and compounded throughout the flexible material. However, the friction reducing agent 36 could be provided in other forms.

The friction reducing agent 36 is typically integrated into the formulation used to manufacture of the flexible material of the wiper strip 22. In the exemplary embodiments, the formulation includes 2 parts to 5 parts of the friction reducing agent 36 per 100 parts of unvulcanized rubber. The size and shape of the friction reducing agent 36 can vary. The composition of the friction reducing agent 36, however, includes at least one amide. The at least one amide can include any component in the amide chemical family. Typically, the entire friction reducing agent 36 consists of one or more amides. In the exemplary embodiments, the one or more amides are selected from the group consisting of oleamides and euricimides. In one example embodiment, the friction reducing agent 36 includes or consists of at least one oleamide. In another example embodiment, the friction reducing agent 36 includes or consists of at least one euricimide. In yet another example embodiment, the friction reducing agent 36 includes or consists of a mixture of different amides. For example, the friction reducing agent 36 could include or consists of a mixture at least one oleamide and at least one euricimide. The friction reducing agent 36 could alternatively include or consists of a mixture at least one oleamide and at least one euricimide In another example embodiment, the friction reducing agent 36 includes a mixture of amides having different molecular weights, for example a mixture of different euricimides having different molecular weights.

The at least one amide is used as the friction reducing agent 36 due to its low molecular weight and adapted compatibility. Upon vulcanization, a portion of the friction reducing agent 36 will migrate to the outer surface 27 of the flexible material of the wiper strip 22 and create a friction reducing film 38, as shown in FIG. 3B, which engages the windshield during use of the wiper device 20. The friction reducing film 38 includes the same at least one amide used as the friction reducing agent 36. The friction reducing film 38 can have various different thicknesses and can be located along a portion of the outer surface 27 or the entire outer surface 27 of the wiper strip 22. In the exemplary embodiment, the friction reducing agent 36 is added to the flexible material such that the friction reducing film 38 forms along at least the wiping portion 24 of the wiper strip 22. However, the friction reducing film 38 may also be present along the channels and/or other portions of the wiper strip 22.

Due to the low molecular weight and adapted compatibility of the vulcanized friction reducing agent 36 including the at least one amide, a small portion of the friction reducing agent 36 continuously migrates to the outer surface 27 of the wiper strip 22 to replenish or renew any of the friction reducing film 38 which may have been removed or worn away during use of the wiper device 20, while a larger portion of the friction reducing agent 36 remains in the body of the flexible material. The friction reducing film 38 provides a low friction interface between flexible material of the wiper strip 22 and the windshield of the vehicle under wet and dry conditions. As a function of product life, as the friction reducing film 38 and/or outer surface 27 of the flexible material wears due to use, additional portions of the friction reducing agent 36 present in the body of the flexible material migrate to the exposed outer surface 27 to replenish the friction reducing film 38.

The low friction provided by the friction reducing film 38 minimizes the load on the wiper device 20 and thus extends the life of the wiper device 20, compared to wiper devices experiencing a greater amount of friction between the wiper strip and the windshield. In addition, the friction reducing film 38 provides hydrophobic properties, and thus can prevent or reduce the size of water beads, and prevent the build-up of water, ice, or snow. For example, water formed along the friction reducing film 38 will bead and run off the outer surface 27, i.e. create a low surface tension. The friction reducing film 38 may also reduce noise, such as squeak and reversal chirp, typically associated with high friction between the wiper strip 22 and the windshield during normal operating conditions.

Another aspect of the present invention provides for a method of making the windscreen wiper device 20. The method includes the step of forming the longitudinally extending wiper strip 22 of the flexible material including the friction reducing agent 36, wherein the friction reducing agent 36 includes the at least one amide. In the exemplary embodiments, the at least one amide is provided in the form of a plurality particles, and the particles are mixed together with the unvulcanized rubber material used to form the flexible material. For example, the formulation of the flexible material could include 2 to 5 parts of the at least one amide per 100 parts of the rubber.

The method further includes forming the mixture of amide and rubber into the desired shape of the wiper strip 22, and vulcanizing the mixture to form the flexible material. The forming step typically includes extruding or molding the mixture into the desired shape. The vulcanizing step typically includes curing the mixture, which includes heating and modifying the mixture to form cross-links in the rubber material. The vulcanizing step can be conducted during the shaping step, or as a separate step. During the vulcanizing step, a portion of the friction reducing agent 36 migrates to the outer surface 27 of the flexible material to form the friction reducing film 38. The friction reducing film 38 includes the at least one amide, which has the same composition as the friction reducing agent 36 present in the body of the flexible material.

The method of manufacturing the wiper device 20 can also include providing at least one carrier 32 of a spring-like material to operatively support and bias the wiper strip 22 into a predetermined configuration; and a connecting device 34 for connection with a wiper arm. However, the wiper strip 22 including the friction reducing agent 36 can be used in other wiper device designs. For example, the method can alternatively include manufacturing a wiper device 20 having a conventional design, or another design.

It is to be understood that the above detailed description is with regard to some presently preferred embodiments, and that other embodiments readily discernible from the disclosure herein by those having ordinary skill in the art are incorporated herein and considered to be within the scope of any ultimately allowed claims.

What is claimed is:

1. A windscreen wiper device, comprising:
a longitudinally extending wiper strip of a flexible material, wherein said flexible material is formed from 2 parts to 5 parts of a friction reducing agent per 100 parts of rubber, said flexible material is vulcanized, the friction reducing agent includes at least one amide, and said at least one amide is selected from the group consisting of oleamides and erucamides,
said wiper strip presenting an outer surface,
said wiper strip including a friction reducing film including said at least one amide along at least a portion of said outer surface,
said wiper strip presenting a channel, and said friction reducing agent is disposed along said channel, and
wherein during use of said wiper strip, said friction reducing film wears down and portions of the friction reducing agent migrate to said outer surface of said wiper strip to replenish said friction reducing film.

2. The windscreen wiper device as set forth in claim 1 wherein said at least one amide includes at least one oleamide.

3. The windscreen wiper device as set forth in claim 1 wherein said at least one amide includes at least one erucamide.

4. The windscreen wiper device as set forth in claim 1 wherein said at least one amide includes a mixture of at least one erucamide and at least one oleamide.

5. The windscreen wiper device as set forth in claim 1 including at least one carrier of a spring-like material operatively supporting and biasing said wiper strip into a predetermined configuration; and a connecting device for connection with a wiper arm.

6. The windscreen wiper device as set forth in claim 1, wherein said wiper strip includes a wiping portion and a spoiler portion, said spoiler portion presenting said channel, said wiper device includes a carrier disposed in said channel of said wiper strip, and said friction reducing agent is disposed along said wiping portion and along said channel.

7. A windscreen wiper device, comprising:
a longitudinally extending wiper strip of a flexible material, wherein at least a portion of said flexible material includes a friction reducing agent, and the friction reducing agent includes at least one amide, wherein said friction reducing agent is disposed homogeneously through said flexible material, and
said wiper strip presenting an outer surface,
said wiper strip including a friction reducing film including said at least one amide along at least a portion of said outer surface,
said wiper strip presenting a channel, and said friction reducing agent is disposed along said channel, and
wherein during use of said wiper strip, said friction reducing film wears down and portions of the friction reducing agent migrate to said outer surface of said wiper strip to replenish said friction reducing film.

8. A windscreen wiper device, comprising:
a longitudinally extending wiper strip of a flexible material, wherein at least a portion of said flexible material includes a friction reducing agent, and the friction reducing agent includes at least one amide, wherein said flexible material of said wiper strip presents an outer surface, said wiper strip includes a friction reducing film including said at least one amide along at least a portion of said outer surface, said wiper strip presenting a channel, said friction reducing agent is disposed along said channel, and wherein during use of said wiper strip, said friction reducing film wears down and portions of the friction reducing agent migrate to said outer surface of said wiper strip to replenish said friction reducing film.

9. The windscreen wiper device as set forth in claim 8 wherein said friction reducing film is hydrophobic.

* * * * *